US012625960B2

(12) United States Patent
Peters et al.

(10) Patent No.: US 12,625,960 B2
(45) Date of Patent: May 12, 2026

(54) METHODS FOR FILTERING AND FOR QUALIFYING SECURITY EVENTS OF AN INTRUSION DETECTION SYSTEM

(71) Applicant: Robert Bosch GmbH, Stuttgart (DE)

(72) Inventors: Jeremy Peters, Stuttgart (DE); Jens Kant, Weissach-Flacht (DE); Marcel Kneib, Ingelheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 111 days.

(21) Appl. No.: 18/638,789

(22) Filed: Apr. 18, 2024

(65) Prior Publication Data

US 2024/0386108 A1     Nov. 21, 2024

(30) Foreign Application Priority Data

May 17, 2023     (DE) ..................... 10 2023 204 621.0

(51) Int. Cl.
*G06F 21/00*          (2013.01)
*G06F 21/56*          (2013.01)

(52) U.S. Cl.
CPC ...... *G06F 21/566* (2013.01); *G06F 2221/034* (2013.01)

(58) Field of Classification Search
CPC . G06F 21/566; G06F 21/554; G06F 2221/034
See application file for complete search history.

(56) References Cited

U.S. PATENT DOCUMENTS

2017/0134403 A1* 5/2017 Hearn ................. H04L 63/1425
2023/0073830 A1* 3/2023 Jauss ................... G06F 11/3082

* cited by examiner

*Primary Examiner* — Tri M Tran
(74) *Attorney, Agent, or Firm* — NORTON ROSE FULBRIGHT US LLP

(57)          ABSTRACT

A method for filtering security events of an intrusion detection system of a computer system with a plurality of computing units connected for data communication. The intrusion detection system is configured to detect security events and to classify them according to a plurality of event types; wherein a type-specific counter is initialized for each event type; and wherein, in response to a detection of a security event by the intrusion detection system, the type-specific counter corresponding to the detected security event is in each case incremented until a threshold value is reached, and the detected security event is discarded if the type-specific counter corresponding to the detected security event has reached the threshold value.

13 Claims, 1 Drawing Sheet

METHODS FOR FILTERING AND FOR QUALIFYING SECURITY EVENTS OF AN INTRUSION DETECTION SYSTEM

CROSS REFERENCE

The present application claims the benefit under 35 U.S.C. § 119 of German Patent Application No. DE 10 2023 204 621.0 filed on May 17, 2023, which is expressly incorporated herein by reference in its entirety.

FIELD

The present invention relates to a method for filtering security events of an intrusion detection system, to a method for qualifying security events, and to a computer program for performing them.

BACKGROUND INFORMATION

In computer systems or networks of computing units, intrusion detection systems (IDS) can be used in order to detect attacks on the computer system or on computing units included in the computer system. Detected attacks or attempted attacks can be stored for later analysis, or attempts can be made to prevent the attacks, i.e., attempts can be made to initiate measures that prevent attempted attacks from being successful. The latter can, for example, take place by means of an intrusion prevention system (IPS).

DETAILED DESCRIPTION OF EXAMPLE EMBODIMENTS

According to the present invention, a method for filtering security events of an intrusion detection system, a method for qualifying security events, and a computing unit and a computer program for performing them are provided. Advantageous embodiments of the present invention are disclosed herein.

The present invention uses the measure of using type-specific counters for the event types for an intrusion detection system that classifies attacks as security events according to a plurality of event types, of incrementing the type-specific counter if a security event of the respective event type is detected, and of discarding security events of an event type if the corresponding type-specific counter exceeds a threshold value. This can prevent that frequent occurrence of security events of a particular event type leads to the further processing, e.g., the storing and/or analyzing, of security events of another event type being hindered or prevented. In particular, it is possible to stop an attack strategy in which numerous security events of a particular event type, e.g., of a low danger level, are generated (through corresponding attacks) in order to conceal an attack that leads to security events of another event type, e.g., of a higher danger level.

The method for filtering security events is in particular a computer-implemented method. The method relates to a computer system comprising a plurality of computing units connected for data communication. In a machine, such as a vehicle, the computer system can, for example, be a bus system (for example, a CAN bus system) comprising a plurality of control devices (computing units) and comprising bus lines connecting the control devices to one another. It is assumed that an intrusion detection system is provided with which potential attacks on the computer system are to be detected ("potential" relates to the fact that the case can generally occur that the intrusion detection system detects an attack even though there is no actual attack, e.g., in the case of a malfunction in the computer system, so-called false positive detection). For example, intrusion detection systems detect events and/or patterns that are indicative of an attack, in the data traffic between the computing units and/or in the computing units themselves. For example, a potential attack could be detected if a message cannot be authenticated as part of a message authentication method that is used in the data communication. Voltage fluctuation on the bus lines could also be analyzed in order to detect that an attacker is physically connected to the bus lines.

More generally, according to an example embodiment of the present invention, the intrusion detection system is configured to detect so-called security events and to classify them according to a plurality of event types. Each security event detected thus has a particular event type of the plurality of event types. As described above, a security event may be an event that is detected as a (potential) attack. Additionally, or alternatively, a security event may also be an event in which a security check has been successfully performed (i.e., no potential attack has been detected); e.g., a successful authentication of a message in a message authentication method. The intrusion detection system can include a plurality of security function modules (which can each be implemented as computer program modules and/or hardware module), wherein each security function module performs a particular security check and determines or detects security events accordingly. The event type of a security event can correspond to the security function module that has detected the security event; for example, an event type is assigned to each security function module.

Such intrusion detection systems and the classification into event types are conventional to the person skilled in the art. For example, the AUTOSAR specification (AUTomotive Open System ARchitecture) mentions security functions (so-called "security sensors") as part of software components that can detect security events; cf., for example, the documents "Specification of Intrusion Detection System Protocol," "Requirements on Intrusion Detection System," and "Requirements on Security Extract Template" of the RS22-11 edition of the AUTOSAR specification. The event type can, for example, correspond to the respective security function or be defined based thereon. The "security events" (abbreviated as "SEv") mentioned in the AUTOSAR specification are an example of "security events" within the meaning of the present application.

The intrusion detection system may be implemented by one or more of the computing units of the computer system by means of computer program modules and/or hardware modules. Additionally, or alternatively, a separate computing unit (which is, for example, connected to the bus lines) that implements the intrusion detection system or a part thereof may be provided. In particular, the method for filtering security events according to the present invention can be performed by a computing unit of the computer system or by a separate computing unit.

In one embodiment of the present invention, the type-specific counters are re-initialized, or reset to the initial value, after a predetermined time period has elapsed. This can achieve that all security events are not continuously discarded or disregarded, but that a certain frequency or rate is necessary in this respect.

In one example embodiment of the present invention, the type-specific counters are regularly reduced by a particular value, in particular if they are greater than the initial value.

The regularity can in particular be defined in terms of time, i.e., the type-specific counters are reduced after a predetermined time period has elapsed. This can also achieve that all security events are not continuously discarded or disregarded, but that a certain frequency or rate is necessary in this respect.

In one example embodiment of the present invention, when the operation of the computer system is interrupted, the type-specific counters are stored in a non-volatile memory prior to the interruption and are read from the memory when the operation is resumed. As a result, security events accumulated prior to an interruption, such as a shutdown, etc., can still be considered even after a restart.

In one example embodiment of the present invention, the type-specific counters are initialized each time the operation of the computer system is started. In this embodiment, security events accumulated prior to an interruption are no longer considered after a restart.

In one example embodiment of the present invention, when the operation of the computer system is interrupted, the running of the time period is interrupted and a value indicating the elapsed portion of the time period is stored in the memory and, when the operation is resumed, the value is read from the memory and the running of the time period is continued. As a result, time periods without a security event that have already elapsed prior to an interruption, such as a shutdown, etc., can still be considered even after a restart, which makes the method more accurate.

In one example embodiment of the present invention, the time period is restarted each time the operation of the computer system is started. In this embodiment, time periods that have already elapsed prior to an interruption are no longer considered after a restart.

In one example embodiment of the present invention, different threshold values are provided for different event types. This makes the present invention better configurable.

In one example embodiment of the present invention, the detected security event is classified as qualified if the type-specific counter corresponding to the detected security event has not reached or is below the threshold value. Security events classified as qualified are in particular supplied to further customary processing, such as evaluation and/or storing of the detected security event. In particular, in one embodiment, data relating to security events classified as qualified are stored and/or evaluated.

According to a further aspect of the present invention, a method for qualifying security events in a computer system with a plurality of computing units connected for data communication is proposed. An intrusion detection system configured to detect security events and to classify them according to one or more event types is provided in the computer system. In the method for qualifying security events, security events detected by the intrusion detection system are passed to a filter chain, which comprises at least one filter configured to discard the respectively detected security event or to classify it as qualified, wherein qualified security events are in each case passed to the next filter of the filter chain. In this case, the method according to the present invention for filtering security events forms a filter of the filter chain. Data from security events classified as qualified after passing through the filter chain are stored and/or analyzed.

A computing unit according to the present invention, e.g., a control device of a motor vehicle, is configured, in particular in terms of programming, to perform a method according to the present invention.

The implementation of a method according to the present invention in the form of a computer program or computer program product comprising program code for performing all method steps is advantageous as well since the associated costs are very low, in particular if an executing control device is also used for other tasks and is therefore already available. Lastly, a machine-readable storage medium is provided, on which a computer program as described above is stored. Suitable storage media or data carriers for providing the computer program are in particular magnetic, optical, and electrical memories, such as hard drives, flash memories, EEPROMs, DVDs, etc. Downloading a program via computer networks (internet, intranet, etc.) is also possible. Such a download can take place in a wired, or cabled, or wireless manner (e.g., via a WLAN, a 3G, 4G, 5G, or 6G connection, etc.).

Further advantages and embodiments of the present invention will emerge from the description and the figures.

The present invention is shown schematically in the figures on the basis of exemplary embodiments and is described in detail in the following with reference to the figures.

DETAILED DESCRIPTION OF EXAMPLE EMBODIMENTS

Figure 1:
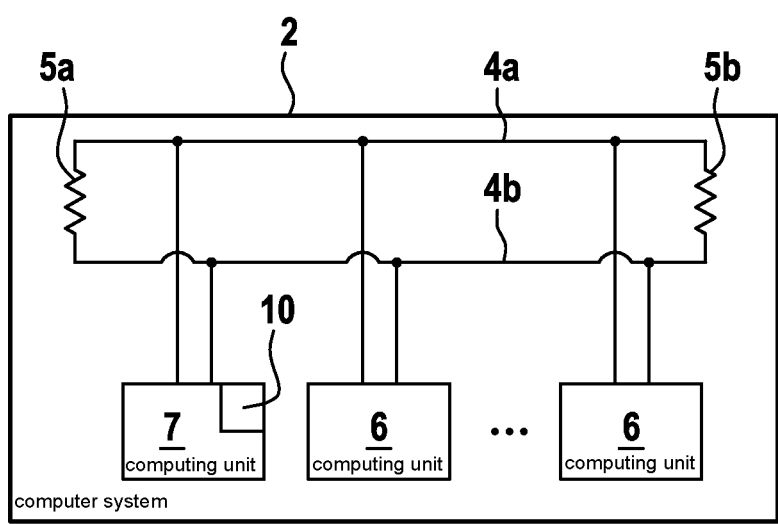
FIG. 1 shows an exemplary design of a computer system in which the present invention can be implemented.

FIG. 1 shows an exemplary design of a computer system 2, in particular of a bus system based on differential voltage signals, such as a CAN bus system, in which embodiments of the present invention can be implemented. The computer system 2 comprises, on the one hand, lines 4a, 4b via which the voltage signals are transmitted and which, in the example of a CAN bus system, are connected to one another via terminating resistors 5a, 5b, which represent the central impedance of the bus system, and, on the other hand, a plurality of computing units 6, 7, i.e., bus stations connected to the two bus lines 4a, 4b in order to communicate with one another via the bus. For this purpose, the bus stations in the CAN bus system use, for example, differential voltages between the two bus lines, which are generated and read by means of transceivers. Examples of the computing units 6, 7 are control devices of a motor vehicle or of a machine that transmit control data, and/or sensors that transmit sensor data, for example to control devices. One of the bus stations or a computing unit 7 of the computing units comprises an intrusion detection system 10 or at least a part of an intrusion detection system (e.g., a security function module as mentioned above). More generally, parts of the intrusion detection system (e.g., the detection of security events) can also be implemented by other computing units 6 and/or by a separate computing unit (not shown). An attack can, for example, come from one of the bus stations whose software has been manipulated, or from an external attacker who establishes a physical connection to the bus lines in order to read and/or send messages in the bus system (both not shown).

Figure 2:
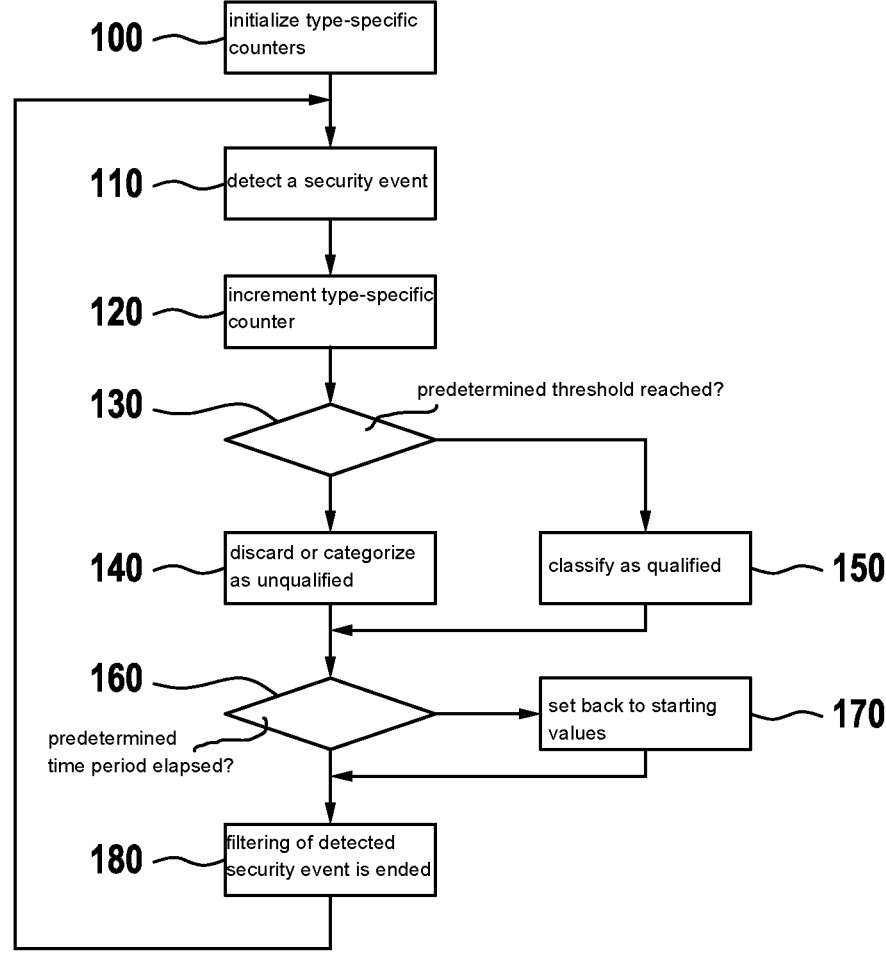
FIG. 2 shows a flowchart of the method for filtering security events according to one example embodiment of the present invention.

FIG. 2 shows a flowchart of the method for filtering security events according to an embodiment of the present invention. With reference to FIG. 1, the steps of the method can, for example, be performed by the computing unit 7, which implements an intrusion detection system 10 or a part thereof. Security events can, for example, be detected (step 110) by the computing unit 7, which implements an intrusion detection system 10 or a part thereof, and/or by one of the other computing units 6, to the extent that they likewise implement subfunctions of the intrusion detection system.

In step 100, type-specific counters are initialized, i.e., a (type-specific) counter is assigned to each of the plurality of event types, wherein, during the initialization, all type-specific counters are set to a respective predetermined starting value, e.g., are set equal to zero.

In step 110, a security event is detected by the intrusion detection system. In step 120, the type-specific counter assigned to the event type of the detected security event is incremented, e.g., incremented by one.

In step 130, it is checked whether the type-specific counter assigned to the event type of the detected security event has reached a predetermined threshold value, i.e., it is checked whether the type-specific counter assigned to the event type of the detected security event is below the threshold value or whether it is equal to or greater than the threshold value. Different event types can have different threshold values.

If it is determined in step 130 that the type-specific counter assigned to the event type of the detected security event has reached, i.e., is equal to or above, the threshold value, the detected security event is discarded or is categorized as unqualified in step 140, i.e., no further evaluation and/or storing of the detected security event takes place. If the method according to the present invention for filtering security events is part of a filter chain, i.e., a filter of a plurality of successive filters, the detected security event is in this case not passed to a subsequent filter, for example.

If it is determined in step 130 that the type-specific counter assigned to the event type of the detected security event has not reached, i.e., is less than, the threshold value, the detected security event is classified as qualified in step 150. In this case, evaluation and/or storing of the detected security event can take place, for example. If the method according to the present invention for filtering security events is part of a filter chain, the detected security event is in this case passed to a subsequent filter, for example.

In the preferred step 160, it is checked whether a predetermined time period has elapsed since the initialization of the type-specific counters or, more generally, since the last setting of the type-specific counters to the respective starting value. Depending on the application (i.e., in particular depending on the computer system and/or the Intrusion detection system), the time period can range from a few seconds to a few days, for example. If the time period has elapsed, the type-specific counters are set back to their respective starting value or initial value in step 170. Unlike what is shown, the procedure of steps 160 and 170 may also be performed independently of the occurrence of a security event, e.g., in parallel with the performance of steps 110, 120, 130, 140, 150, and 180. As an alternative or in addition to resetting the type-specific counters to their respective starting values, it may also be provided to regularly reduce the type-specific counters by a respective predetermined amount. This reduction preferably only takes place if the type-specific counter has a value greater than the starting value and, further preferably, only up to the starting value (i.e., when reducing, the starting value should not be undershot).

In step 180, which takes place after step 140 or step 150 or optionally after step 160 or step 170, the filtering of the detected security event is ended and the method is continued with the filtering of the next security event, i.e., a jump to step 110, the detection of a security event, takes place.

In the event of an interruption of the operation of the computer system, the current values of the type-specific counters can be stored in a non-volatile memory and, when the operation of the computer system is resumed, can be read from the memory and the method can continue starting from the stored values of the type-specific counters, i.e., without initialization. Analogously, the running of the time period can optionally be interrupted, wherein time information as to how much of the time period has already elapsed at the time of the interruption can be stored in the memory, can be read therefrom when the operation of the computer system is resumed, and the time period can continue to be measured starting from the time information. Alternatively, each time the operation of the computer system is restarted, an initialization may take place (step 100).

What is claimed is:

1. A method for filtering security events of an intrusion detection system of a computer system of a vehicle with a plurality of computing units connected by an ECU/CAN bus for data communication, wherein the intrusion detection system is configured to detect security events on the ECU/CAN bus and to classify the security events according to a plurality of event types, the method comprising the following steps:
   initializing a type-specific counter for each of the event types; and
   in response to a detection of a security event by the intrusion detection system:
   incrementing the type-specific counter corresponding to the detected security event unless a threshold value is reached, and
   discarding the detected security event if the type-specific counter corresponding to the detected security event has reached the threshold value,
   wherein the type-specific counters are reduced by a particular value when they are greater than an initial value.

2. The method according to claim 1, wherein:
   the type-specific counters are re-initialized, or are reset to the initial value, after a predetermined time period has elapsed.

3. The method according to claim 1, wherein, when an operation of the computer system is interrupted, the type-specific counters are stored in a non-volatile memory prior to the interruption and are read from the memory when the operation is resumed.

4. The method according to claim 3, wherein:
   the type-specific counters are re-initialized, or are reset to the initial value, after a predetermined time period has elapsed; and
   the operation of the computer system is interrupted, a running of the time period is interrupted and a value indicating an elapsed portion of the time period is stored in the memory and, when the operation is resumed, the value is read from the memory and the running of the time period continues.

5. The method according to claim 1, wherein the type-specific counters are initialized each time an operation of the computer system is started.

6. The method according to claim 2, wherein the time period is restarted each time an operation of the computer system is started.

7. The method according to claim 1, wherein different threshold values are provided for different event types.

8. The method according to claim 1, wherein, for each detected security event, the detected security event is qualified when the type-specific counter corresponding to the detected security event has not reached or is below the threshold value.

9. The method according to claim 8, wherein:

security events classified as qualified are stored and/or evaluated; and/or data relating to security events classified as qualified are stored and/or evaluated.

10. A method for qualifying security events in a computer system of a vehicle with a plurality of computing units connected by an ECU/CAN bus for data communication, in which computer system is provided an intrusion detection system configured to detect security events on the ECU/CAN bus and to classify the security events according to one or more event types, the method comprising the following steps:

passing security events detected by the intrusion detection system to a filter chain including at least one filter configured to discard each respective detected security event or to classify the respective detected security event as qualified;

passing each of the qualified security events to the next filter of the filter chain, wherein the next filter of the filter chain includes:

initializing a type-specific counter for each of the event types, and incrementing the type-specific counter corresponding to the detected security event unless a threshold value is reached, and discarding the detected security event if the type-specific counter corresponding to the detected security event has reached the threshold value, wherein the type-specific counters are reduced by a particular value when they are greater than an initial value; and storing or analyzing data from the security events classified as qualified after passing through the filter chain.

11. A computing unit for filtering security events of an intrusion detection system of a computer system of a vehicle with a plurality of computing units connected by an ECU/CAN bus for data communication, wherein the intrusion detection system is configured to detect security events on the ECU/CAN bus and to classify the security events according to a plurality of event types, the computing unit comprising a hardware processor configured to:

initialize a type-specific counter for each of the event types; and in response to a detection of a security event by the intrusion detection system:

increment the type-specific counter corresponding to the detected security event unless a threshold value is reached, and discard the detected security event if the type-specific counter corresponding to the detected security event has reached the threshold value, wherein the type-specific counters are reduced by a particular value when they are greater than an initial value.

12. A non-transitory machine-readable storage medium on which is stored a computer program for filtering security events of an intrusion detection system of a computer system of a vehicle with a plurality of computing units connected by an ECU/CAN bus for data communication, wherein the intrusion detection system is configured to detect security events on the ECU/CAN bus and to classify the security events according to a plurality of event types, the computer program, when executed by a computer, causing the computer to perform the following steps:

initializing a type-specific counter for each of the event types; and in response to a detection of a security event by the intrusion detection system:

incrementing the type-specific counter corresponding to the detected security event unless a threshold value is reached, and discarding the detected security event if the type-specific counter corresponding to the detected security event has reached the threshold value, wherein the type-specific counters are reduced by a particular value when they are greater than an initial value.

13. The non-transitory machine-readable storage medium of claim 12, wherein the type-specific counters are re-initialized, or are reset to the initial value, after a predetermined time period has elapsed.

* * * * *